(12) United States Patent
Stark et al.

(10) Patent No.: US 11,434,095 B2
(45) Date of Patent: Sep. 6, 2022

(54) MATERIAL AND HARDWARE TO AUTOMATICALLY CLEAN FLEXIBLE ELECTRONIC WEB ROLLS

(71) Applicant: INTERNATIONAL TEST SOLUTIONS, INC., Reno, NV (US)

(72) Inventors: Mark M. Stark, Reno, NV (US); Alan E. Humphrey, Reno, NV (US)

(73) Assignee: International Test Solutions, LLC, Reno, NV (US)

( * ) Notice: Subject to any disclaimer, the term of this patent is extended or adjusted under 35 U.S.C. 154(b) by 0 days.

(21) Appl. No.: 16/283,613

(22) Filed: Feb. 22, 2019

(65) Prior Publication Data
US 2019/0262872 A1    Aug. 29, 2019

Related U.S. Application Data

(60) Provisional application No. 62/634,545, filed on Feb. 23, 2018.

(51) Int. Cl.
  B65H 18/10 (2006.01)
  B08B 1/02 (2006.01)
  (Continued)

(52) U.S. Cl.
  CPC ............. B65H 18/103 (2013.01); B08B 1/02 (2013.01); B08B 1/04 (2013.01); B08B 7/0028 (2013.01);
  (Continued)

(58) Field of Classification Search
  CPC ... B32B 2250/02; B32B 2250/03; B08B 1/02; B08B 1/04; B08B 1/00; B08B 1/008
  See application file for complete search history.

(56) References Cited

U.S. PATENT DOCUMENTS

| 2,971,208 A | 2/1961 | Moore et al. |
| 3,453,677 A | 7/1969 | Cutler |

(Continued)

FOREIGN PATENT DOCUMENTS

| CN | 1643065 A | 7/2005 |
| CN | 1669677 A | 9/2005 |

(Continued)

OTHER PUBLICATIONS

US 11,002,784 B1, 05/2021, Humphrey et al. (withdrawn)
(Continued)

*Primary Examiner* — Andrew A Horton
(74) *Attorney, Agent, or Firm* — Thomas Omholt; Erika R. Singleton

(57) ABSTRACT

Novel materials and devices can remove small defects from long rolls of flexible electronics material while they are in continuous motion. The cleaning materials are designed to remove small particles without transferring defects or damaging the flexible electronics. The device generally consists of variable speed, motor-driven cylinders mounted on moveable brackets. The cylinders are capable of matching the speed of the cleaning material such that the cleaning material is always in contact with the web roll to be cleaned. The brackets are capable of rotating so the same material can be used more than once. Another material is used to remove debris from the cleaning material. A similar device consisting of motor-driven cylinders and moveable is used to apply the debris removal film to the cleaning film, allowing the cleaning film to be used multiple times.

5 Claims, 4 Drawing Sheets

(51) Int. Cl.

| | |
|---|---|
| *B65H 20/06* | (2006.01) |
| *B65H 20/02* | (2006.01) |
| *B32B 27/08* | (2006.01) |
| *B32B 27/28* | (2006.01) |
| *B32B 27/32* | (2006.01) |
| *B32B 27/36* | (2006.01) |
| *C11D 7/22* | (2006.01) |
| *C11D 7/24* | (2006.01) |
| *C11D 7/26* | (2006.01) |
| *C11D 7/32* | (2006.01) |
| *C11D 11/00* | (2006.01) |
| *C11D 17/04* | (2006.01) |
| *B08B 7/00* | (2006.01) |
| *B08B 1/04* | (2006.01) |
| *G03G 21/00* | (2006.01) |
| *B41F 23/00* | (2006.01) |

(52) U.S. Cl.
CPC ............ *B32B 27/08* (2013.01); *B32B 27/281* (2013.01); *B32B 27/283* (2013.01); *B32B 27/32* (2013.01); *B32B 27/36* (2013.01); *B65H 20/02* (2013.01); *B65H 20/06* (2013.01); *C11D 7/22* (2013.01); *C11D 7/241* (2013.01); *C11D 7/266* (2013.01); *C11D 7/3263* (2013.01); *C11D 11/0047* (2013.01); *C11D 17/049* (2013.01); *G03G 21/0041* (2013.01); *G03G 21/0076* (2013.01); *B32B 2250/24* (2013.01); *B32B 2307/748* (2013.01); *B32B 2432/00* (2013.01); *B41F 23/002* (2013.01); *B65H 2404/27* (2013.01)

(56) References Cited

U.S. PATENT DOCUMENTS

| | | | |
|---|---|---|---|
| 3,644,953 A | 2/1972 | Christiansen | |
| 3,675,265 A | 7/1972 | Landen et al. | |
| 3,717,897 A | 2/1973 | Strickland | |
| 3,945,079 A | 3/1976 | Westberg | |
| 4,104,755 A | 8/1978 | Smith | |
| 4,277,160 A | 7/1981 | Yamada | |
| 4,334,780 A | 6/1982 | Pernick | |
| 4,590,422 A | 5/1986 | Milligan | |
| 4,832,772 A | 5/1989 | Noguchi et al. | |
| 5,011,513 A | 4/1991 | Zador et al. | |
| 5,192,455 A | 3/1993 | Marcel | |
| 5,205,460 A | 4/1993 | Sato et al. | |
| 5,220,279 A | 6/1993 | Nagasawa | |
| 5,444,265 A | 8/1995 | Hamilton | |
| 5,485,949 A | 1/1996 | Tomura et al. | |
| 5,507,874 A | 4/1996 | Su et al. | |
| 5,597,346 A | 1/1997 | Hempel, Jr. | |
| 5,652,428 A | 7/1997 | Nishioka et al. | |
| 5,671,119 A | 9/1997 | Huang et al. | |
| 5,685,043 A | 11/1997 | LaManna et al. | |
| 5,690,749 A | 11/1997 | Lee | |
| 5,699,584 A | 12/1997 | Wieloch et al. | |
| 5,746,928 A | 5/1998 | Yen et al. | |
| 5,766,061 A | 6/1998 | Bowers | |
| 5,778,485 A | 7/1998 | Sano et al. | |
| 5,783,018 A | 7/1998 | Gore et al. | |
| 5,814,158 A | 9/1998 | Hollander et al. | |
| 5,930,857 A | 8/1999 | Ramos | |
| 5,946,184 A | 8/1999 | Kanno et al. | |
| 5,968,282 A | 10/1999 | Yamasaka | |
| 6,019,663 A | 2/2000 | Angell et al. | |
| 6,030,674 A | 2/2000 | Onishi et al. | |
| 6,056,627 A | 5/2000 | Mizuta | |
| 6,118,290 A | 9/2000 | Sugiyama et al. | |
| 6,121,058 A | 9/2000 | Shell et al. | |
| 6,130,104 A | 10/2000 | Yamasaka | |
| 6,170,116 B1 | 1/2001 | Mizuta | |
| 6,183,677 B1 | 2/2001 | Usui et al. | |
| 6,193,587 B1 | 2/2001 | Lin et al. | |
| 6,224,470 B1 | 5/2001 | Hoey et al. | |
| 6,256,555 B1 | 7/2001 | Bacchi et al. | |
| 6,280,298 B1 | 8/2001 | Gonzales | |
| 6,306,187 B1 | 10/2001 | Maeda et al. | |
| 6,322,433 B1 | 11/2001 | Matsumura | |
| 6,326,413 B1 | 12/2001 | Blackwell et al. | |
| 6,355,495 B1 | 3/2002 | Fujino et al. | |
| 6,366,112 B1 | 4/2002 | Doherty et al. | |
| 6,474,350 B1 | 11/2002 | Mizuta | |
| 6,507,393 B2 | 1/2003 | Batchelder | |
| 6,523,208 B1 | 2/2003 | Muscato et al. | |
| 6,646,455 B2 | 11/2003 | Maekawa et al. | |
| 6,733,876 B1 | 5/2004 | Beardsley et al. | |
| 6,741,086 B2 | 5/2004 | Maekawa et al. | |
| 6,776,171 B2 | 8/2004 | Carpenter et al. | |
| 6,777,966 B1 | 8/2004 | Humphrey et al. | |
| 6,813,828 B2 | 11/2004 | Dlugokecki et al. | |
| 6,817,052 B2 | 11/2004 | Grube | |
| 6,821,620 B2 | 11/2004 | Namikawa et al. | |
| 6,840,374 B2 | 1/2005 | Khandros et al. | |
| 6,884,300 B2 | 4/2005 | Sato et al. | |
| 6,888,344 B2 | 5/2005 | Maekawa et al. | |
| 6,960,123 B2 | 11/2005 | Mitarai | |
| 7,202,683 B2 | 4/2007 | Humphrey et al. | |
| 7,254,861 B2 | 8/2007 | Morioka et al. | |
| 7,306,849 B2 | 12/2007 | Buckholtz et al. | |
| 7,530,887 B2 | 5/2009 | Jiang et al. | |
| 7,575,790 B2 | 8/2009 | Terada | |
| 7,621,436 B2 | 11/2009 | Mii | |
| 7,655,316 B2 * | 2/2010 | Parkhe | B08B 1/00 428/192 |
| 7,779,527 B2 | 8/2010 | Yudovsky et al. | |
| 7,866,530 B1 | 1/2011 | Riachentsev | |
| 7,975,901 B2 | 7/2011 | Maeda et al. | |
| 8,371,316 B2 * | 2/2013 | Humphrey | B08B 1/00 134/93 |
| 8,790,466 B2 | 7/2014 | Broz et al. | |
| 8,801,869 B2 | 8/2014 | Broz et al. | |
| 8,876,983 B2 | 11/2014 | Widhalm | |
| 9,093,481 B2 | 7/2015 | Levinson | |
| 9,131,829 B2 | 9/2015 | Namikawa | |
| 9,318,362 B2 | 4/2016 | Leung et al. | |
| 9,452,455 B2 | 9/2016 | An | |
| 9,595,456 B2 | 3/2017 | Humphrey et al. | |
| 9,825,000 B1 | 11/2017 | Humphrey et al. | |
| 9,831,215 B1 | 11/2017 | Chen et al. | |
| 9,833,818 B2 | 12/2017 | Humphrey et al. | |
| 9,933,457 B2 | 4/2018 | Leikermoser | |
| 9,941,148 B2 | 4/2018 | Gratix | |
| 10,002,776 B2 | 6/2018 | Humphrey et al. | |
| 10,109,504 B2 | 10/2018 | Humphrey et al. | |
| 10,195,648 B2 | 2/2019 | Broz et al. | |
| 10,361,169 B2 | 7/2019 | Humphrey et al. | |
| 10,399,809 B2 | 9/2019 | Montoya | |
| 10,406,568 B2 | 9/2019 | Humphrey et al. | |
| 10,741,420 B2 | 8/2020 | Humphrey et al. | |
| 10,766,057 B2 | 9/2020 | Tokashiki et al. | |
| 10,792,713 B1 | 10/2020 | Humphrey et al. | |
| 10,896,828 B2 | 1/2021 | Humphrey et al. | |
| 11,035,898 B1 | 6/2021 | Humphrey et al. | |
| 2001/0007421 A1 | 7/2001 | Marcuse et al. | |
| 2002/0028641 A1 | 3/2002 | Okubo et al. | |
| 2002/0071115 A1 | 6/2002 | Batchelder | |
| 2002/0079349 A1 | 6/2002 | Macover | |
| 2002/0096187 A1 | 7/2002 | Kuwata et al. | |
| 2002/0097060 A1 | 7/2002 | Maekawa et al. | |
| 2002/0102065 A1 | 8/2002 | Kiani | |
| 2002/0112300 A1 | 8/2002 | Muhr-Sweeney | |
| 2003/0027496 A1 | 2/2003 | Back et al. | |
| 2003/0076490 A1 | 4/2003 | Clark | |
| 2003/0092365 A1 | 5/2003 | Grube | |
| 2003/0138644 A1 | 7/2003 | Khandros et al. | |
| 2003/0180532 A1 | 9/2003 | Namikawa et al. | |
| 2003/0200989 A1 | 10/2003 | Humphrey et al. | |
| 2004/0029316 A1 | 2/2004 | Schnegg et al. | |
| 2004/0083568 A1 | 5/2004 | Morioka et al. | |
| 2004/0096643 A1 | 5/2004 | Sato et al. | |

(56) References Cited

U.S. PATENT DOCUMENTS

| | | | |
|---|---|---|---|
| 2004/0200515 A1 | 10/2004 | Saito et al. | |
| 2005/0001645 A1 | 1/2005 | Humphrey et al. | |
| 2005/0026552 A1 | 2/2005 | Fawcett et al. | |
| 2005/0034743 A1 | 2/2005 | Kim et al. | |
| 2005/0042958 A1 | 2/2005 | Namikawa et al. | |
| 2005/0118414 A1* | 6/2005 | Namikawa | G11B 23/505 428/343 |
| 2005/0126590 A1 | 6/2005 | Sato et al. | |
| 2005/0255796 A1 | 11/2005 | Haga | |
| 2005/0287789 A1 | 12/2005 | Tunaboylu | |
| 2006/0008660 A1 | 1/2006 | Parkhe | |
| 2006/0029441 A1 | 2/2006 | Atsushi | |
| 2006/0065290 A1 | 3/2006 | Broz et al. | |
| 2006/0076337 A1 | 4/2006 | Brunner et al. | |
| 2006/0151004 A1 | 7/2006 | Terada et al. | |
| 2006/0219754 A1 | 10/2006 | Clauberg et al. | |
| 2006/0272678 A1 | 12/2006 | Corrado et al. | |
| 2006/0289605 A1 | 12/2006 | Park et al. | |
| 2007/0125491 A1 | 6/2007 | Yonemizu et al. | |
| 2007/0140754 A1 | 6/2007 | Poxon et al. | |
| 2007/0153062 A1 | 7/2007 | Shie et al. | |
| 2007/0178814 A1 | 8/2007 | Sato et al. | |
| 2007/0205753 A1 | 9/2007 | Hau et al. | |
| 2007/0284419 A1 | 12/2007 | Matlack et al. | |
| 2008/0023028 A1 | 1/2008 | Fujita | |
| 2008/0070481 A1 | 3/2008 | Tamura et al. | |
| 2008/0207095 A1 | 8/2008 | Goto | |
| 2008/0242576 A1 | 10/2008 | Tamura et al. | |
| 2009/0197404 A1 | 8/2009 | Yang | |
| 2009/0212807 A1 | 8/2009 | Chen et al. | |
| 2009/0227048 A1 | 9/2009 | Fang et al. | |
| 2009/0248128 A1 | 10/2009 | Nassif et al. | |
| 2010/0132736 A1 | 6/2010 | Lin et al. | |
| 2010/0149785 A1 | 6/2010 | Dubuc et al. | |
| 2010/0170533 A1 | 7/2010 | Terada et al. | |
| 2010/0210079 A1 | 8/2010 | Masuoka et al. | |
| 2010/0258144 A1 | 10/2010 | Broz et al. | |
| 2010/0294435 A1 | 11/2010 | Maeda et al. | |
| 2011/0132396 A1 | 6/2011 | Humphrey et al. | |
| 2011/0229675 A1 | 9/2011 | Namikawa et al. | |
| 2012/0048298 A1 | 3/2012 | Humphrey et al. | |
| 2012/0258144 A1 | 10/2012 | Klinman et al. | |
| 2012/0266461 A1 | 10/2012 | Nickut et al. | |
| 2012/0299175 A1 | 11/2012 | Tran | |
| 2013/0056025 A1 | 3/2013 | Widhalm | |
| 2013/0336689 A1 | 12/2013 | Swing | |
| 2013/0336699 A1 | 12/2013 | Vo et al. | |
| 2014/0191618 A1 | 7/2014 | Kijima et al. | |
| 2014/0251535 A1 | 9/2014 | Ishii et al. | |
| 2014/0338698 A1 | 11/2014 | Humphrey et al. | |
| 2015/0187617 A1 | 7/2015 | Leung et al. | |
| 2015/0191654 A1 | 7/2015 | Wang | |
| 2015/0214095 A1 | 7/2015 | Mischitz et al. | |
| 2016/0131702 A1 | 5/2016 | Sinsheimer | |
| 2017/0010306 A1 | 1/2017 | Na et al. | |
| 2017/0203322 A1 | 7/2017 | Ivri et al. | |
| 2017/0239695 A1 | 8/2017 | Hamilton | |
| 2018/0017748 A1 | 1/2018 | Mir Shafiei | |
| 2018/0071798 A1 | 3/2018 | Humphrey et al. | |
| 2018/0125284 A1 | 5/2018 | Cave | |
| 2018/0308821 A1 | 10/2018 | Humphrey et al. | |
| 2019/0262871 A1 | 8/2019 | Stark et al. | |
| 2019/0263613 A1 | 8/2019 | Stark et al. | |
| 2019/0263614 A1 | 8/2019 | Stark et al. | |
| 2020/0200800 A1 | 6/2020 | Stark et al. | |
| 2020/0388590 A1 | 12/2020 | Jindo et al. | |
| 2021/0005483 A1 | 1/2021 | Humphrey et al. | |
| 2021/0146464 A1 | 5/2021 | Humphrey et al. | |
| 2021/0151317 A1 | 5/2021 | Humphrey et al. | |

FOREIGN PATENT DOCUMENTS

| | | | |
|---|---|---|---|
| CN | 1717285 | 1/2006 | |
| CN | 1889240 A | 1/2007 | |
| CN | 101252082 A | 8/2008 | |
| CN | 101339898 A | 1/2009 | |
| CN | 103831676 A | 6/2014 | |
| DE | 20-2004-009619 | 10/2004 | |
| DE | 10-2005-052308 | 5/2007 | |
| EP | 1890326 A2 | 2/2008 | |
| EP | 1942519 A1 | 7/2008 | |
| GB | 2532255 | 5/2016 | |
| GB | 2532255 A * | 5/2016 | ........... B08B 7/0028 |
| JP | S5788742 A | 6/1982 | |
| JP | 2005/8131743 | 8/1983 | |
| JP | S6190434 A | 5/1986 | |
| JP | S6199336 A | 5/1986 | |
| JP | S61124139 A | 6/1986 | |
| JP | S61245536 A | 10/1986 | |
| JP | 63-204728 | 8/1988 | |
| JP | S63204728 A | 8/1988 | |
| JP | H01276720 A | 11/1989 | |
| JP | H0435778 A | 2/1992 | |
| JP | 2005/211195 | 8/1993 | |
| JP | H0596057 U | 12/1993 | |
| JP | H05326471 A | 12/1993 | |
| JP | H07244074 | 9/1995 | |
| JP | H08264627 A | 10/1996 | |
| JP | H09102453 A | 4/1997 | |
| JP | H09260326 A | 10/1997 | |
| JP | H10154686 A | 6/1998 | |
| JP | 2011/145212 | 5/1999 | |
| JP | 2000/232125 | 8/2000 | |
| JP | 2000/332069 | 11/2000 | |
| JP | 2002248433 A | 9/2002 | |
| JP | 2004063669 A | 2/2004 | |
| JP | 2005/326250 | 11/2005 | |
| JP | 2006/013185 | 1/2006 | |
| JP | 2006015457 A | 1/2006 | |
| JP | 2006019616 A | 1/2006 | |
| JP | 2006/165395 | 6/2006 | |
| JP | 2006/186133 | 7/2006 | |
| JP | 2006216886 A | 8/2006 | |
| JP | 2007002225 A | 1/2007 | |
| JP | 2007035684 A | 2/2007 | |
| JP | 2007157902 A | 6/2007 | |
| JP | 2007329377 A | 12/2007 | |
| JP | 2008047601 A | 2/2008 | |
| JP | 2008/070280 | 3/2008 | |
| JP | 2008066710 A | 3/2008 | |
| JP | 2008/147551 | 6/2008 | |
| JP | 2008/270270 | 11/2008 | |
| JP | 2009138027 A | 6/2009 | |
| JP | 2011/117938 | 6/2011 | |
| JP | 2004/840118 | 12/2011 | |
| JP | 2014/107561 | 6/2014 | |
| JP | 6067951 B1 | 1/2017 | |
| KR | 10-2003-92730 | 7/2003 | |
| KR | 20070074398 A | 7/2007 | |
| KR | 20070074426 A | 7/2007 | |
| KR | 10-2008-89297 | 3/2009 | |
| KR | 10-2011-063275 | 6/2011 | |
| KR | 20140066450 A | 6/2014 | |
| KR | 20170127650 A | 11/2017 | |
| KR | 20180108396 A | 10/2018 | |
| TW | 409322 | 10/2000 | |
| WO | 98/47663 | 10/1998 | |
| WO | WO01/08819 A1 | 2/2001 | |
| WO | WO2010030052 A1 | 3/2010 | |
| WO | WO 12/32481 | 3/2012 | |

OTHER PUBLICATIONS

International Test Solutions, Probe Clean™ on Silicon Wafer Publication, dated May 2002 (2 pgs.).

International Test Solutions Publication, Probe Clean™ for Use on Prober Abrasion Plates, dated May 2002 (2 pgs.).

International Test Solutions Publication, Probe Clean™ Non-Abrasive Method to Clean Loose Debris from Probe Tips, dated May 2002 (1 pg.).

International Test Solutions Publication, Probe Polish™ on Silicon Wafer, dated May 2002 (2 pgs.).

(56) References Cited

OTHER PUBLICATIONS

International Test Solutions Publication, Probe Polish™ for Use on Prober Abrasion Plates, dated May 2002 (2 pgs.).
International Test Solutions Publication, Probe Scrub™ Restore Probe Tip Performance and Remove Bonded Debris, dated May 2002 (1 pg.).
International Test Solutions, Probe Form™ Publication, dated Jul. 7, 2005 (2 pgs.).
International Test Solutions, Cleaning Parameters for TEL Probers P8 and P8-XL Publication, dated printout dated Sep. 18, 2003 http://web.archive.org/web/20030918014522/http://inttest.net/products/PC2002.pdf (3 pgs.).
Anonymous: "Wire Bonding"—Wikipedia—Retrieved from the Internet https://en.wikipedia.org/wiki/Wire_bonding\ (2 pgs).
Neware, Pallawi, B., et al., "Flexible Organic Light Emitting Diodes—FOLED," Oct. 26, 2015, vol. 5, No. 5, pp. 3457-3462.
Zhao, L., et al., "Novel Method for Fabricating Flexible Active Matrix Organiz Light Emitting Diode (AMOLED) Displays," Sep. 21, 2011, (5 pp.).
American Society for Testing And Materials, Standard Test Methods of Liner Removal at High Speeds from Pressure-Sensitive Label Stock, Designation: D5375/D5375M—98, current edition approved Apr. 10, 1998, Annual Book of ASTM Standards, vol. 14.02., 3 pages.
ASTM International, Standard Terminology of Adhesives, Designation: D907-15, current edition approved Sep. 15, 2015, 13 pages.
ASTM International, Standard Test Method for Loop Track, Designation: D6195-03, current edition approved Apr. 1, 2011, 5 pages.
ASTM International, Standard Test Method for Pressure-Sensitive Tack of Adhesives Using an Inverted Probe Machine, Designation: D2979-16, current edition approved Oct. 1, 2016, 3 pages.
Margaret Rouse, Definition "end effector" fromWhatIs.com, Feb. 26, 2009, retrieved on Nov. 7, 2019, 2 pages. https://whatis.techtarget.com/definition/end-effector?vgnextfmt=print.
Istvan Benedek and Luc J. Heymans, "Pressure-Sensitive Adhesives Technology", 1997, Marcel Dekker, Inc., Chapter 6, pp. 186-187. (Year: 1997).

* cited by examiner

MATERIAL AND HARDWARE TO AUTOMATICALLY CLEAN FLEXIBLE ELECTRONIC WEB ROLLS

PRIORITY CLAIMS/RELATED APPLICATIONS

This application claims priority under 35 USC 120 and 119(e) to U.S. Provisional Patent Application Ser. No. 62/634,545, filed Feb. 23, 2018 and entitled "Novel Material And Hardware To Automatically Clean Flexible Electronic Web Rolls", the entirety of which is incorporated herein by reference.

FIELD

The disclosure relates to novel materials and hardware that can be integrated into a roll-to-roll manufacturing system and used to clean the working surface of rolls of web film used for manufacturing various items and products including, for example, flexible electronics and other similar applications including organic LEDs (OLED), display panels, and photovoltaic devices.

BACKGROUND

Flexible electronics, also known as flex circuits, is a technology for assembling electronic circuits by mounting electronic devices on flexible web substrates, such as polyimide, PEEK or transparent conductive polyester film. Additionally, flex circuits can be screen printed silver circuits on polyester sheets or other similarly flexible sheets. With lower manufacturing costs than traditional silicon-based devices, and the ability to flex, this technology enables many computing and display applications. For example, this technology can also be used to produce photovoltaic cells and LED lighting panels. This processing method is known as roll-to-roll processing, web processing, reel-to-reel processing or R2R processing.

To mass-produce flexible electronics at high volume and low cost, manufacturers are developing roll-to-roll technology to provide inline processing of wide and long rolls—up to 1 meter wide and 2000 meters long. There are manufacturers who can produce these rolls of materials, but the manufacturing process leaves small defects on the surface of the material in the range of 0.5 microns to 250 microns.

Various steps in the device manufacturing process also produce defects on the working surface of the web material. The defects from these roll manufacturing processes and the device manufacturing processes can interfere with device processing and lead to low overall yield of working devices from the roll of flexible electronics.

It is difficult to remove these very small defects from the surface of the flexible electronic web roll. They are tightly bonded by electrostatic forces, in particular, Van der Waals forces, which are too strong to be overcome by ordinary washing techniques such as rinsing. Solvent-based cleaning solutions can damage the devices and cannot be used effectively.

Cleaning the surface of the flexible electronics web with an adhesive roll is possible, but rapid buildup of defects on the adhesive roll will make it ineffective very quickly. Furthermore, most adhesives will be too sticky and either damage the surface or transfer some material to the flexible electronics web roll. Such transfer will also cause yield loss and reduce the number of working devices created on the surface of the flexible electronics roll.

Cleaning systems do exist today for flexible electronics web that make use of a single or double roller. FIG. 5 illustrates an example of a commercially-available cleaning system that uses rollers. The roller (16) is made of an adhesive material, typically silicone. This material is cleaned by a roll of adhesive tape (15), that can be discarded periodically. However, the silicone roller (16) must make repeated contact with the roll 15 to be cleaned. In addition, a small cleaning surface area is repeatedly contacting a long roll of material. The cleaning must be stopped to change the adhesive cleaning roll, so there is a significant trade-off between cleanliness and line stoppage. Once there is a buildup of larger particles on the adhesive tape, it will no longer effectively clean the roller. Also, this technique does not clean small particles well due to the electrostatic bonding of the small particles discussed above.

Therefore, a need exists in the field for novel cleaning material that can remove the defects from the surface of the flexible electronics roll without sticking or transferring material. There is also a need for a device that enables this material to be run continuously as the long flexible electronics roll is running through the manufacturing process. There is also a need for another material that can remove defects/debris from the cleaning material so it can be used multiple times on the very long rolls of material, and there is need for a device to apply the defect-removal sheet to the cleaning sheet.

BRIEF DESCRIPTION OF THE DRAWINGS

Some embodiments are illustrated as an example and are not limited by the figures of the accompanying drawings, in which like references may indicate similar elements and in which.

DETAILED DESCRIPTION OF ONE OR MORE EMBODIMENTS

Figure 1:
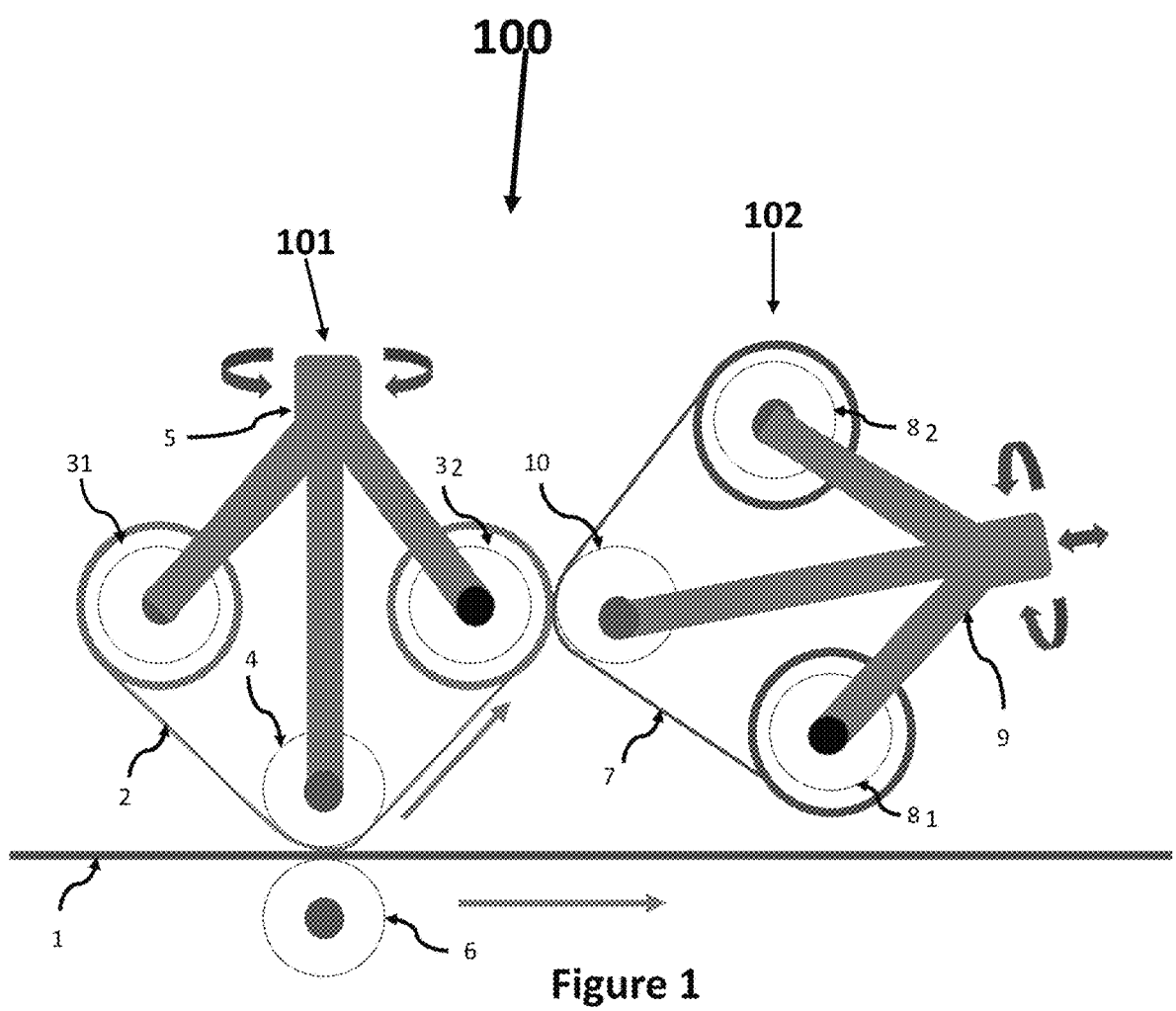
FIG. 1 depicts a cross section view of one example of the cleaning material and positioning devices according to various embodiments.

The disclosure is particularly applicable to a cleaning system and method for roll to roll manufacturing systems for flexible electronics as disclosed in the figures and described below with the particular cleaning structure and it is in this context that the disclosure will be described. It will be appreciated, however, that the cleaning system and method may be used for other manufacturing applications in which it is desirable to be able to effectively clean the system. For example, the cleaning system and method may be used with a roll to roll processing system and method that, for example, may be used to perform nanoimprint photolithography or manufacture photovoltaics, such as flexible polymer solar cells, perovskite solar cells, organic solar cells, etc. The cleaning system and method may also be used to clean the flexible web rolls for automotive applications that would include various requirements for different types of stackable battery constructions being built using roll-to-roll techniques. The cleaning system and method may also be used to clean the flexible web rolls for biomechanical applications in which cleanliness and defect control is critical for roll-to-roll fabrication of various wearable technologies in which electronic and mechanical devices are integrated, printed, or embossed into fabrics and flexible various substrates that can be worn on the skin as well as wearable pharmaceuticals. Furthermore, the cleaning system and method also may be used to clean roll to roll systems used to manufacture display products, such as for example, flexible AMOLED (Active Matrix Light Emitting Diodes) displays that may be used in next generation flex display phones. Furthermore, the cleaner system and method may be used for roll to roll fabrication methods for flex circuits examples of which are described at pdfs.semanticscholar.org/1eb5/d0be006ae57dfeb0cbaa8ac4ec1a56c59a19.pdf and inpress-co.com/wp-content/uploads/2015/10/Paper653457-3462.pdf that are incorporated by reference herein.

The terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of techniques and steps are disclosed. Each of these steps and techniques has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

New cleaning materials, devices, apparatuses, and methods for positioning cleaning materials on roll-to-roll web sheet manufacturing are discussed herein. In the following description, for purposes of explanation, numerous specific details are set forth in order to provide a thorough understanding. It will be evident, however, to one skilled in the art may be practiced without these specific details. The present disclosure is to be considered as an exemplification of the disclosure, and is not intended to limit the disclosure to the specific embodiments illustrated by the figures or description below.

The web material cleaning system, device and method will now be described by referencing the appended figures illustrating one or more embodiments. FIG. 1 depicts a cross section view of one example of the cleaning material and positioning devices according to various embodiments. In the various embodiments, a device 100 to clean a flexible web roll 1 has a device 101 that is configured with at least two winding cylinders 31, 32, which pass a cleaning material 2 over an application cylinder 4, bringing it in contact with the material 1 to be cleaned. In the example in FIG. 1, the cylinder 31 may be a source cylinder from which the cleaning material rolls off and the cylinder 32 may be a take-up cylinder onto which the cleaning material rolls after a portion of it has been used to clean the flexible web roll 1. The device 100 may be known as a moving cleaner device. In one embodiment, the direction of movement of the cleaning material 2 is the same as the direction of movement of the material 1 to be cleaned as shown by the arrows in FIG. 1. The material 1 may be supported by another cylinder 6 as shown in FIG. 1. In another embodiment not shown in FIG. 1, the material 1 to be cleaned may be stretched against the cleaning material 2 where the cleaning material 2 passes over roller 4 without a supporting cylinder. The cylinders 31, 32 may be driven by a variable speed motor that may be synchronized so that the speed and direction of the cleaning material 2 is substantially similar to the speed of the movement of material 1. In the embodiments, the cylinders 31, 32 motors can rotate in either direction. The straight arrows indicate an example of the direction of web 1 travel and cleaning material 2 travel during the cleaning process.

In the embodiments, the cylinders 31, 32 are supported by a moveable bracket 5 which conveys power to the motors. The bracket 5 is able to move away from the surface of web 1 and rotate through 180 degrees so as to reverse the direction of the cleaning roll motion and the cleaning material 2 thus requiring the motor that rotate in either direction. When the direction of the cleaning material 2 is reversed, the cleaning material is wrapped around the take-up cylinder 32 and then taken up by the source cylinder 31 after each portion of the cleaning material 2 cleans the web 1. The bracket 5 can then move back to position the cleaning material 2 against the roll 1. This may allow the same roll of material 2 to be used multiple times for cleaning. In the embodiments, the bracket 5 may also be designed to allow easy exchange of the roll of cleaning material 2. The bracket 5 may be made from aluminum, metal alloy, hard web, or other suitable material. In the preferred embodiments, the bracket 5 and cylinders 31, 32 are under control of a system sequence controller. The sequence controller is a software program that runs on a computer; either on the main system controller for the web manufacturing tool or on a stand-alone unit integrated to the main system controller through a data connector—RS232 or similar. The sequence controller will control the cylinder motors 31,32. It will continuously match speed between the cleaning film and the web material that is being processed, including stopping the cleaning roll when the web is stopped. The sequencer will also control the movement and rotation of bracket 5 or 9. The sequence controller will collect data from the sensors described below 15. When the sensors indicate that the roll is near the end, the bracket will withdraw the cylinders, stop the cylinders, rotate 180 degrees, and then re-start the cylinders and match speed to the web material. The sequencer will move the bracket so the cylinders 31, 32 are in contact with the web material. After a user-defined number of these rotations, the sequencer will pull bracket 5 or 9 away from the web material and provide a signal to the system noting that it is time to replace the material.

A second device 102 as shown in FIG. 1 may be used to remove debris from the cleaning material 2. In some embodiments, the device 100 that cleans the flexible web roll 1 has the second device 102 that is configured with at least two winding cylinders 81, 82, which pass a second cleaning material 7 over an application cylinder 10, bringing it in contact with the cleaning material 2 to be cleaned. In the example shown in FIG. 1, the cylinder 81 may be a source cylinder on which the second cleaning material 7 is rolled and the cylinder 82 may be a take-up cylinder onto which the second cleaning material 7 rolls after the portions cleans the cleaning material 2. In the embodiments, this contact is done where the material 2 is supported by cylinder 3. The position of the second device 102 may also be above the cleaning material 2. In another embodiment of the device, the device 102 may be on the side where the cleaning material 2 is unwinding from the cylinder 31. In another embodiment, the second cleaning material 7 may be supported by the additional cylinder 10. In another embodiment, the second cleaning material 7 may be stretched against cylinder 10 without support. The cylinders 81,82 are driven by a variable speed motor that may be synchronized with the speed of the movement of cleaning material 2. In preferred embodiments, the cylinders motors can rotate in either direction.

In the embodiments, the cylinders 81,82 are supported by a moveable bracket 9 which conveys power to the motors. The bracket 9 is able to move away from the surface of the cleaning material 2 and rotate through 180 degrees so as to reverse the direction of the second cleaning material 7. The bracket can then move back to position the second cleaning material 7 against the cleaning material 2. When the direction of the second cleaning material is reversed, cylinder 82 may be the source cylinder while cylinder 81 may be the take-up cylinder. This can allow the same roll of material to be used multiple times for cleaning. In the preferred embodiments, the bracket 9 may also be designed to allow easy exchange of the roll of cleaning material. The bracket may be made from aluminum, metal alloy, hard web, or other suitable material. In the preferred embodiments, the bracket 9 and cylinders 81, 82 are under control of a system sequence controller. The materials for the cleaning material 2 and the second cleaning material 7 are described below with reference to FIGS. 3-4.

In operation, the device 100 continuously moves the cleaning material web 2 that moves at the same speed as the flexible electronics roll 1 in order to clean the flexible electronics roll 1 as it continuously moves. Both the flexible electronics roll 1 and cleaning material 2 are moving such that a different portion of the cleaning material 2 cleans each different portion of the flexible electronics roll 1. In addition, device 102 carries a second cleaning material 7 that moves and makes contact with portions of the cleaning material 2 and continuously cleans the cleaning material 2 at the take-up cylinder as shown in FIG. 1. As described above, the direction of motion of both the cleaning material 2 and material 7 can be reversed so that both the cleaning material 2 and material 7 may be reused. As a result, the cleaning material 2 and material 7 may be used for a longer period of time until they have to be replaced. As shown in FIG. 1, the web 1 and cleaning material may contact/be adjacent each other at a first cleaning point and the cleaning material 2 and second cleaning material may contact/be adjacent each other at a second cleaning point. In the operation, the cleaning material 2 has a plurality of portions and each portion cleans a particular portion of the web 1 as the web 1 and cleaning material 2 move in the same direction and speed. Similarly, the second cleaning material 7 has a plurality of portions and each portion cleans a particular portion of the cleaning material 2 as the cleaning material 2 and second cleaning material 7 move in the same direction and speed.

Figure 2:
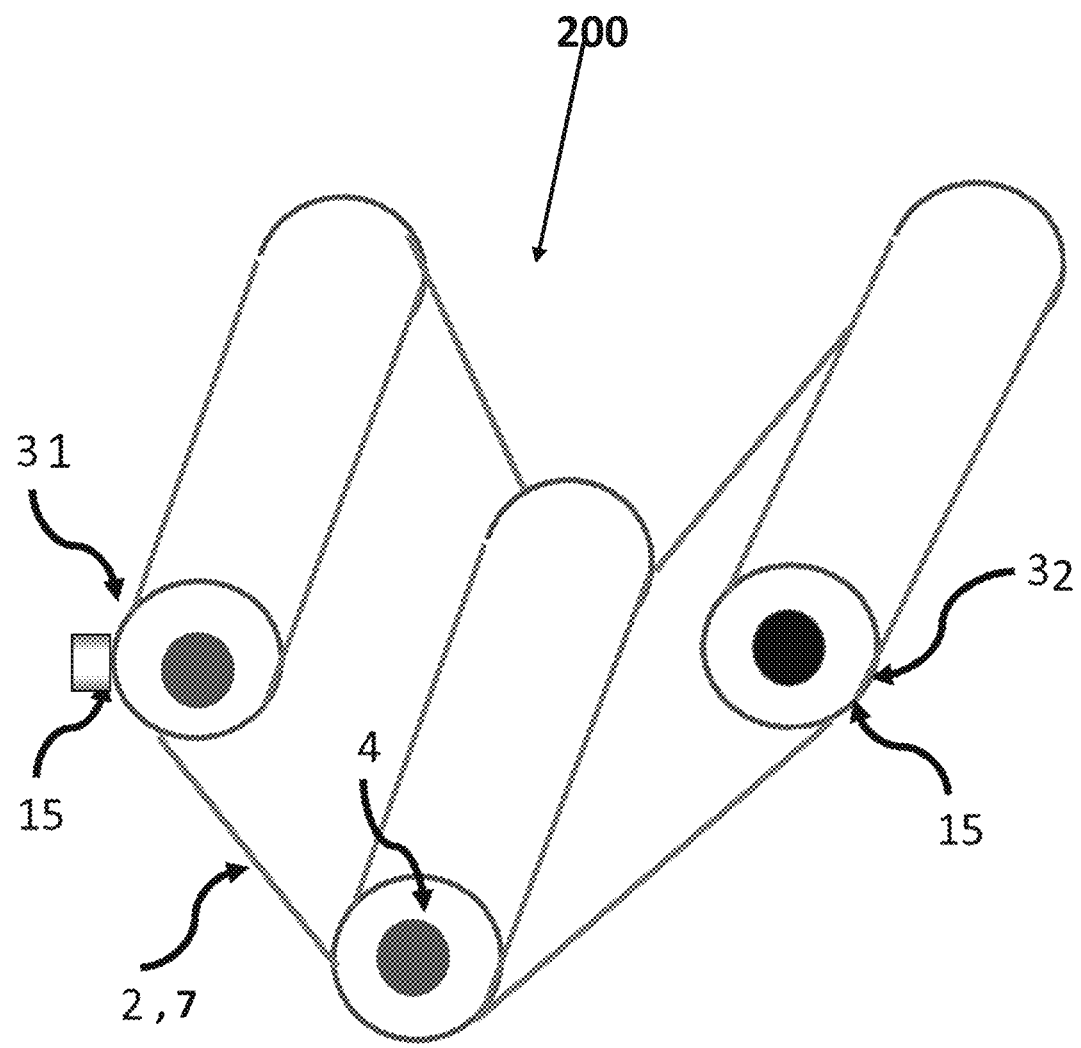
FIG. 2 illustrates a perspective view of one example of a cleaning device according to various embodiments described herein.

FIG. 2 illustrates a perspective view of one example of a cleaning device 200 according to various embodiments described herein. In the embodiments, the cylinders 31, 32 (which correspond to the cylinders 31,32 in FIG. 1) or the cylinders 81,82 may each have a sensor 15 which can determine how much material 2 or 7 remains on the cleaning material roll. For example, the sensor 15 most commonly used for this purpose is a commercially available distance sensor that measures distance from a fixed point to the roll surface and these are typically laser or infra-red reflective sensors. Another type of sensor would be a through-beam laser sensor at a fixed point above the cylinder so that once the roll was empty, the through beam would not be blocked indicating that the roll needs to be changed. The signal from this sensor may be integrated with the system sequence controller to determine when the bracket 5 or 9 should be rotated as described above.

Figure 3:
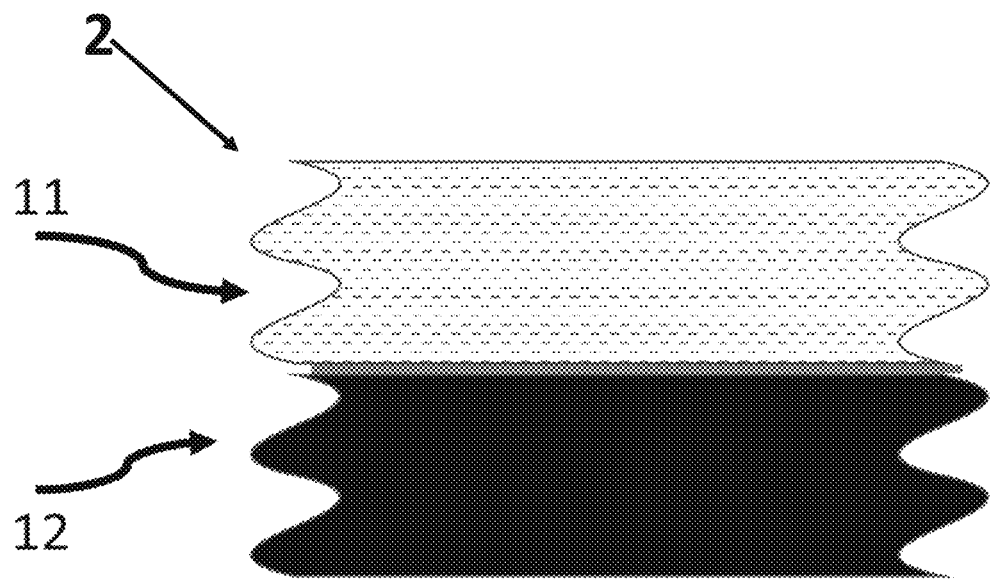
FIG. 3 shows a view of the cross section of the cleaning material used to clean the flexible roll according to various embodiments described herein.

FIG. 3 shows the cross-section of the cleaning material 2 used to clean the flexible electronics web 1. The cleaning material 2 selected should be flexible, effective at removing small particles, and should not contaminate the surface of the flexible electronics roll 1. One example of the material is silicone and silicone-containing polymers with a Durometer Shore A of 40-100 and a surface energy of 15 to 40 dynes/cm. One example of this material is a cured two-component silicone commercially-available material on a polyester carrier film. The surface energy may be measured using the Fowkes two-component method with water and diiodomethane as probe liquids. In another embodiment, polyimide may be used as the cleaning material 2. Polyimide has good cleaning characteristics, but is less sticky than silicone. This may be an advantage for areas where the web material is under less tension and may adhere to the silicone, affecting the web tool. The cleaning material 2 may include a cleaning surface layer 11 with a polymer thickness of 20 to 300 microns and may be supported on a web film 12, which may be in the range of 20 to 300 microns. The web film 12 may consist of polyester, polyethylene, polyimide, or other suitably flexible and durable web film. In some embodiments of the material 2, in order to use the cleaning material repeatedly and depending on the adhesive properties of the cleaning layer 11, the cleaning surface layer 11 may have a release agent or release liner on the wind up side on top of the layer 11. The release agent or liner could be used for any of the material types to extend the life of the cleaning films by providing mechanical support during the winding and unwinding process.

The contaminants to be picked up includes organic contaminants, metallic contaminants, byproducts of the manufacturing process, and biological contaminants introduced by individuals working in the facility. The particles sizes would range from 0.1 micron to 10 centimeters. The particles adhere to the cleaning film through electrostatic attraction, the majority of the particles are held by Van der Waals forces. The cleaning material type would be chosen to match the web film being cleaned and the fixturing holding the web. The material would be selected to optimize cleaning while not significantly deforming the material being cleaned.

The cleaning material may be the same width as the web material, it could be narrower or slightly wider that the material. This could be user defined. The width of the cleaning material would be between 10 cm and 1000 cm. There may also be embodiments with wider cleaning material.

Figure 4:
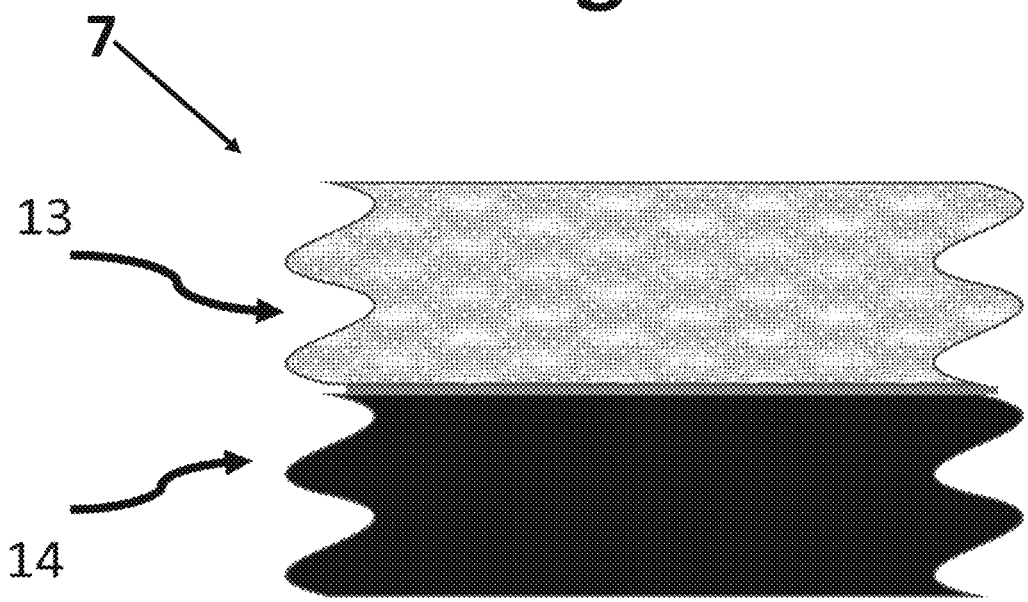
FIG. 4 shows a view of the cross section of the cleaning material used to remove defects from the cleaning material according to various embodiments described herein.
Figure 5:
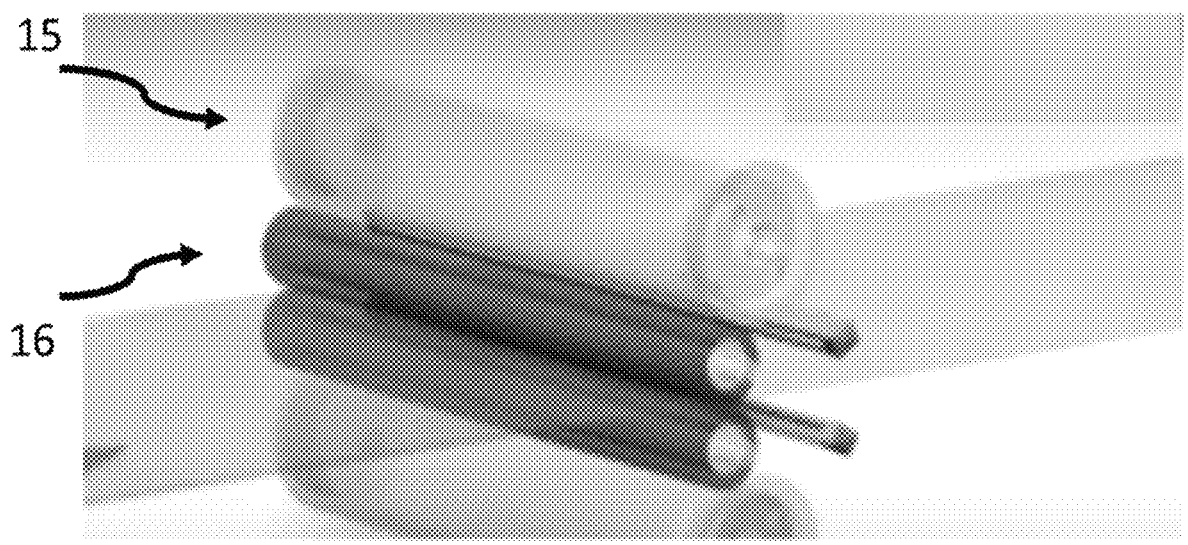
FIG. 5 shows a view of the currently-existing cleaning systems consisting of cleaning rollers with a second roll of material used to clean the rollers.

FIG. 4 shows the cross-section of the material 7 used to remove debris from the cleaning material. The material selected should be flexible, effective at removing small particles, and should not contaminate the surface of the cleaning material 3. The materials may include pressure sensitive adhesives and other non-curing adhesives. In the embodiments, the cleaning material 7 may include a cleaning surface layer 13 that may have a polymer thickness of 20 to 300 microns and may be supported on a web film 14, which may be in the range of 20 to 300 microns. The web film may consist of polyester, polyethylene, polyimide, or other suitably flexible and durable web film. In some embodiments, in order to use the cleaning material 13 repeatedly and depending on the adhesive properties of the cleaning layer 11, the cleaning surface layer 13 may have a release agent or release liner on the wind up side on top of the layer 13. In another embodiment, each of the cleaning material shown in FIGS. 3 and 4 may have a cleaning material surface on both sides of the support web.

In another embodiment of this device, multiple devices configured with different cleaning films to optimize cleaning of different types of particles may be placed along the web surface. The cleaning films may have different surface properties, such as surface roughness, tack, or surface energy to more efficiently pick up different particle types. In one embodiment, a device with material with a rougher and stickier surface could be in contact with the web first to remove large particles, followed by a device with a smoother and less sticky film to remove smaller particles. In another embodiment, one material might be selected for surface properties best suited for collecting metal particles, and another material might be selected for surface properties best suited for collecting organic particles.

In another embodiment, an anti-static device, such as an ionizer, may be placed over the web material on an input side of the cleaning device (left hand side of the exemplary device shown in FIG. 1) to eliminate static buildup that may be present on the surface before cleaning. A similar anti-static device may be placed at an exit side of the cleaning device (right hand side of the exemplary device shown in FIG. 1).

While preferred materials for elements have been described, the device is not limited by these materials. Other materials with similar characteristics may be used.

Although the system, device and method has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the disclosure, are contemplated thereby, and are intended to be covered by the following claims.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers,. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media.

Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques. p It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A cleaning material for removing small particles from a flexible electronics roll without leaving residues, the cleaning material comprising:
   a cleaning material roll having a length and width that is less than the length, cleaning material roll having a release layer formed on top of a cleaning layer on top of a web film that are rolled up to form the cleaning material roll;
   the cleaning layer having the width and length of the cleaning material roll, the cleaning material layer being silicone containing polymer having a surface energy of 15 to 40 dynes/cm to remove small particles from 0.1 microns to 10 centimeters from the flexible electronics web; and
   the release liner provides mechanical support for a winding and unwinding of the cleaning material roll.

2. The cleaning material of claim 1, wherein the polymer layer has a Durometer Shore of between about 40 and about 100.

3. The cleaning material of claim 1, wherein the cleaning layer has a thickness of between 20 and 300 microns.

4. The cleaning material of claim 3, herein the web film has a thickness of between 20 and 300 microns.

5. The cleaning material of claim 4, wherein the web film is one of polyester, polyethylene and polyimide.

* * * * *